United States Patent [19]

Ito et al.

[11] Patent Number: 4,690,431

[45] Date of Patent: Sep. 1, 1987

[54] SYSTEM FOR CONTROLLING CORNERING CHARACTERISTICS OF WHEELED VEHICLE

[75] Inventors: Ken Ito; Naohiko Inoue, both of Yokohama, Japan

[73] Assignee: Nissan Motor Co., Ltd., Yokohama, Japan

[21] Appl. No.: 773,621

[22] Filed: Sep. 9, 1985

[30] Foreign Application Priority Data

Sep. 10, 1984 [JP] Japan ................... 59-188154

[51] Int. Cl.⁴ .............................................. B62D 6/02
[52] U.S. Cl. ..................................... 280/771; 280/91; 180/140; 180/142
[58] Field of Search ............... 180/140, 141, 142, 143, 180/132; 364/424, 425; 280/91, 771; 318/580, 585, 586, 587

[56] References Cited

U.S. PATENT DOCUMENTS

| 3,011,579 | 12/1961 | Milliken | 180/142 |
| 3,866,706 | 2/1975 | Lincke | 180/142 |
| 3,897,846 | 8/1978 | Inoue | 180/142 |
| 4,412,594 | 11/1983 | Furukawa | 180/142 |
| 4,418,780 | 12/1983 | Ito | 180/142 |
| 4,441,572 | 4/1984 | Ito | 180/140 |
| 4,476,529 | 10/1984 | Nakamura | 364/424 |

FOREIGN PATENT DOCUMENTS

| 3124181 | 1/1983 | Fed. Rep. of Germany . |
| 3300640 | 7/1984 | Fed. Rep. of Germany . |
| 3525543 | 1/1986 | Fed. Rep. of Germany . |
| 0079754 | 6/1980 | Japan | 180/142 |
| 0026366 | 2/1984 | Japan | 180/140 |

Primary Examiner—John J. Love
Assistant Examiner—Karin L. Ferriter
Attorney, Agent, or Firm—Schwartz, Jeffery, Schwaab, Mack, Blumenthal & Evans

[57] ABSTRACT

A control system for steering either or both of front wheel pair and a rear wheel pair of a controlled vehicle has a processing unit such as a microcomputer for determining a desired vehicle behavior, and an actuator unit for steering either or both of the front and rear wheel pairs under command of the processing unit. The processing unit first determines a desired value of a dynamical variable such as a yaw acceleration corresponding to sensed steering input and sensed vehicle speed by solving equations of motion of a desired vehicle obtained by setting vehicle parameters appearing in the equations to desired values determined by the desired vehicle. The processing unit further determines a desired value of a steering angle of at least one of the front and rear wheel pairs which is required to achieve the desired value of the dynamical variable by solving equations of motion obtained by setting the vehicle parameters equal to actual values determined by the controlled vehicle. The control system further has an actual behavior sensor for sensing an actual value of the yaw acceleration or other dynamical variable of the controlled vehicle, and an adjuster for adjusting the actual values of one or more vehicle parameters used in determining the desired steering angle, in accordance with the actual value of the dynamical variable.

18 Claims, 9 Drawing Figures

SYSTEM FOR CONTROLLING CORNERING CHARACTERISTICS OF WHEELED VEHICLE

BACKGROUND OF THE INVENTION

The present invention relates to a control system for steering a vehicle in which only front wheels are steerable or all wheels are steerable.

In a conventional vehicle having only a mechanical steering linkage, front wheels are steered in accordance with an angular displacement of a steering wheel (steering input quantity), and a dynamical variable such as yaw rate responsive to steering input is determined uniformly by a mechanical construction of the vehicle. Therefore, cornering characteristics are fixed according to a type of vehicle. It is practically impossible to endow a vehicle of a sedan type with characteristics of a sports car type without changing a vehicle construction drastically.

A competition car (rally car) is required to have superior accelerating ability and superior steering response simultaneously. However, these two requirements are incompatible because improvement of accelerating ability by increasing engine displacement unavoidably deteriorates steering response by increasing vehicle weight.

Furthermore, the cornering characteristics of a vehicle are changed when tire properties are changed by tire wear or tire change, or when the road surface condition changes.

SUMMARY OF THE INVENTION

It is an object of the present invention to provide a steering control system which can endow a controlled vehicle with desired cornering characteristics which are free from restraint of actual vehicle construction and which are constant irrespectively of changes in road surface condition or tire properties or other conditions of the vehicle.

According to the present invention, the steering control system for a controlled vehicle having a pair of first wheels and a pair of second wheels has (1) steering input sensing means, (2) vehicle speed sensing means, (3) target behavior determining means, (4) steering angle determining means, (5) actuating means, (6) actual behavior sensing means, and (7) parameter adjusting means.

The steering input sensing means senses a steering input quantity representing a driver's steering command of the controlled vehicle and determines a sensed value of the steering input quantity. The vehicle speed sensing means senses a vehicle speed of the controlled vehicle and determines a sensed value of the vehicle speed.

The target behavior determining means is connected with the steering input sensing means and the vehicle speed sensing means for determining a desired value of at least one of dynamical variables such as a yaw acceleration and a centripetal acceleration corresponding to the sensed values of the steering input quantity and vehicle speed by solving group of equations of motion of a desired vehicle obtained by setting vehicle parameters equal to desired values determined by the desired vehicle.

The steering angle determining means is connected with the target behavior determining means for determining a desired value of a first wheel steering angle of the first wheels required to achieve the desired value of the dynamical variable, by using the desired value of the dynamical variable and actual values of the vehicle parameters determined by the controlled vehicle.

The actuating means steers the first wheels so that an actual first wheel steering angle is maintained equal to the desired value of the first wheel steering angle.

The actual behavior sensing means senses an actual value of the dynamical variable of the controlled vehicle. The parameter adjusting means adjusts the actual value of at least one of the vehicle parameters used by the steering angle determining means in accordance with the actual value of the dynamical variable sensed by the actual behavior sensing means.

DETAILED DESCRIPTION OF THE INVENTION

Figure 1:
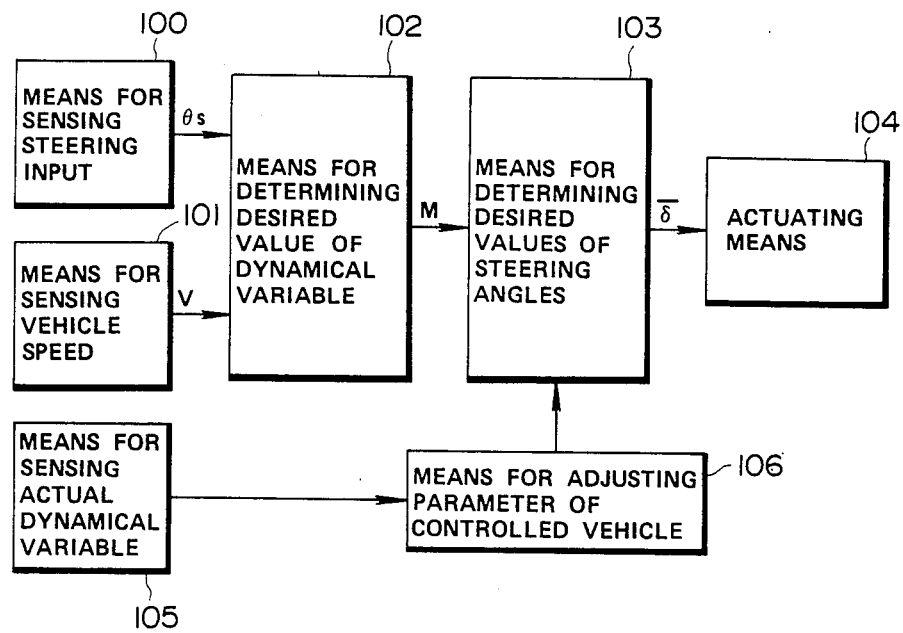
FIG. 1 is a block diagram of a steering control system according to the present invention.

FIG. 1 shows a steering control system of the present invention for steering a controlled vehicle. The system of the present invention has seven means 100–106.

The means 100 senses a steering input quantity such as an angular displacement $\theta_s$ of a steering wheel of the controlled vehicle. The means 101 senses a vehicle speed V of the controlled vehicle. The means 102 determines a desired value M of at least one of dynamical variables such as a yaw acceleration and a centripetal acceleration corresponding to sensed values of the steering input quantity and vehicle speed by using equations of vehicle motion in which parameters are set equal to desired values determined by a desired vehicle. That is, the means 102 theoretically predicts a behavior of the desired vehicle responsive to the sensed steering input quantity and vehicle speed. The means 103 determines a desired value or desired values of either or both of front wheel steering angle and rear wheel steering angle from the desired value M of the dynamical variable determined by the means 102 and actual values of the parameters determined by the controlled vehicle. The means 104 steer the front wheels and/or the rear wheels in accordance with the desired value of the steering angle. The means 105 senses an actual value of the dynamical variable of the controlled vehicle. The means 106 adjust one or more of the actual values of the parameters used by the means 103 in accordance with the actual value of the dynamical variable sensed by the means 105.

Figure 2:
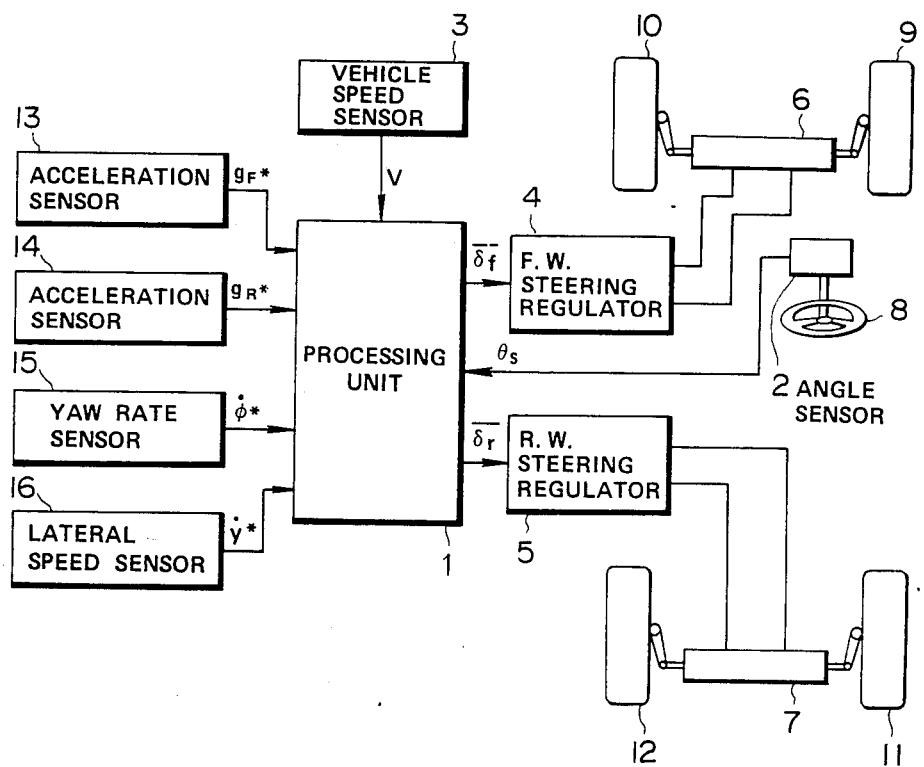
FIG. 2 is a schematic view showing one embodiment of the present invention.

FIG. 2 shows a steering control system of one embodiment according to the present invention. In this embodiment, the means 102, 103 and 106 are united into a processing unit 1 such as a digital microcomputer or an analog computing circuit system. The steering input sensing means 100 takes the form of an angle sensor 2 for sensing an angle of a steering wheel 8 of the controlled vehicle. The means 101 takes the form of a vehicle speed sensor 3. The means for sensing actual dynamical variable 105 comprises a front acceleration sensor 13 for sensing an actual value $g_F^*$ of a lateral acceleration of front wheels 9 and 10 of the controlled vehicle, a rear acceleration sensor 14 for sensing an actual value $g_R^*$ of a lateral acceleration of rear wheels 11 and 12 of the controlled vehicle, a yaw rate sensor 15 for sensing an actual value $\dot{\phi}^*$ of the controlled vehicle, and a lateral speed sensor 16 for sensing an actual value $\dot{y}^*$ of a lateral speed of the controlled vehicle. Signals are inputted to the processing unit 1 from the sensors 2, 3 and 13–16.

The actuating means 104 comprises a front wheel steering regulator 4, a front wheel steering hydraulic actuator 6 for steering the front wheels 9 and 10 of the controlled vehicle under command of the front wheel steering regulator 4, a rear wheel steering regulator 5, and a rear wheel steering hydraulic actuator 7 for steering the rear wheels 11 and 12 of the controlled vehicle under command of the rear wheel regulator 5.

Figure 3:
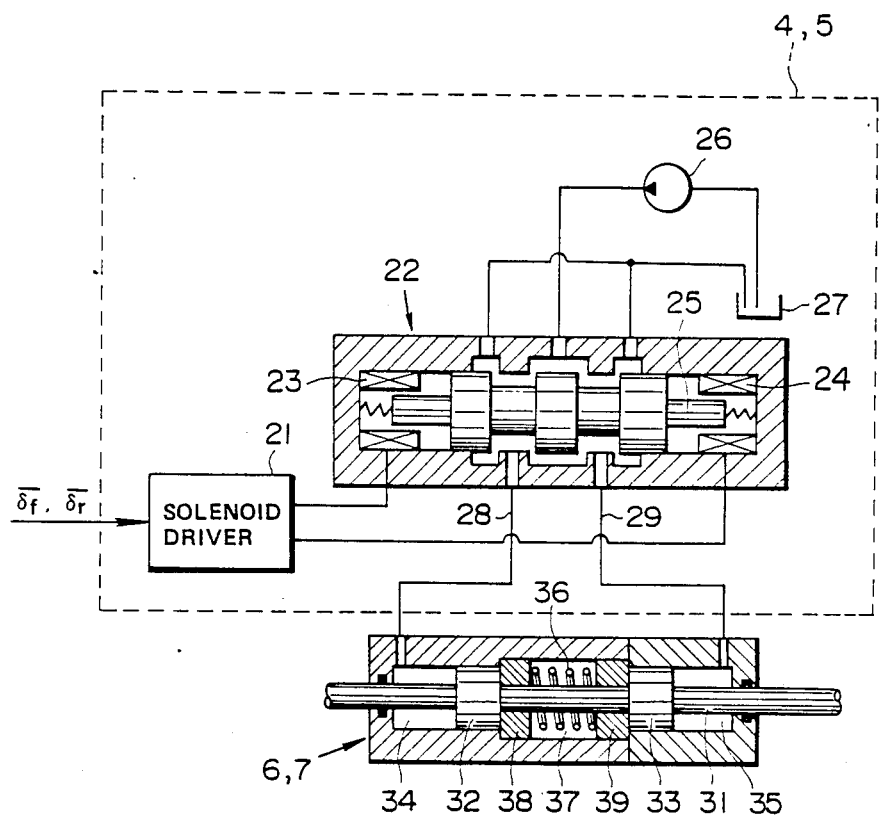
FIG. 3 is a view partly in section showing front wheel and rear wheel steering regulators and actuators shown in FIG. 2.

FIG. 3 shows a front wheel steering system consisting of the regulator 4 and hydraulic actuator 6, and a rear wheel steering system consisting of the regulator 5 and hydraulic actuator 7. Both steering systems are essentially identical to each other.

Each of the hydraulic actuators 6 and 7 has two pistons 32 and 33 and a shaft 31 both ends of which are connected, respectively, to tie rods. Each hydraulic actuator 6 or 7 steers the wheels by moving the shaft 31 axially in accordance with an oil pressure difference between right and left oil chambers 34 and 35.

In a central chamber 37 of each actuator 6 or 7, discs 38 and 39 are loosely mounted on the shaft 31. A spring 36 is disposed between the discs 38 and 39 for biasing the discs in the opposite directions. The spring 36 retores the shaft 31 to its neutral position when the oil pressure is drained from the right and left chambers 34 and 35.

Each of the front and rear steering regulators 4 and 5 has a solenoid driver 21, a control valve 22, an oil pump 26 and an oil tank 27.

The control valve 22 of each regulator 4 or 5 has oil passages 28 and 29 leading, respectively, to the left and right chambers 34 and 35 of the hydraulic actuator 6 or 7. The control valve 22 further has a spool 25 which regulates the oil flow rate through the oil passages 28 and 29 by moving axially. Left and right ends of the spool 25 are surrounded, respectively, by left and right electromagnetic solenoids 23 and 24 so that the spool 25 is moved axially by the solenoids 23 and 24.

The solenoid driver 21 of each regulator 4 or 5 supplies a current signal proportional to the desired value $\delta_F$ or $\delta_R$ of the front or rear steering angle determined by the processing unit 1 to either of the left and right solenoids 23 and 24 which is selected in accordance with a steering direction.

Figure 4:
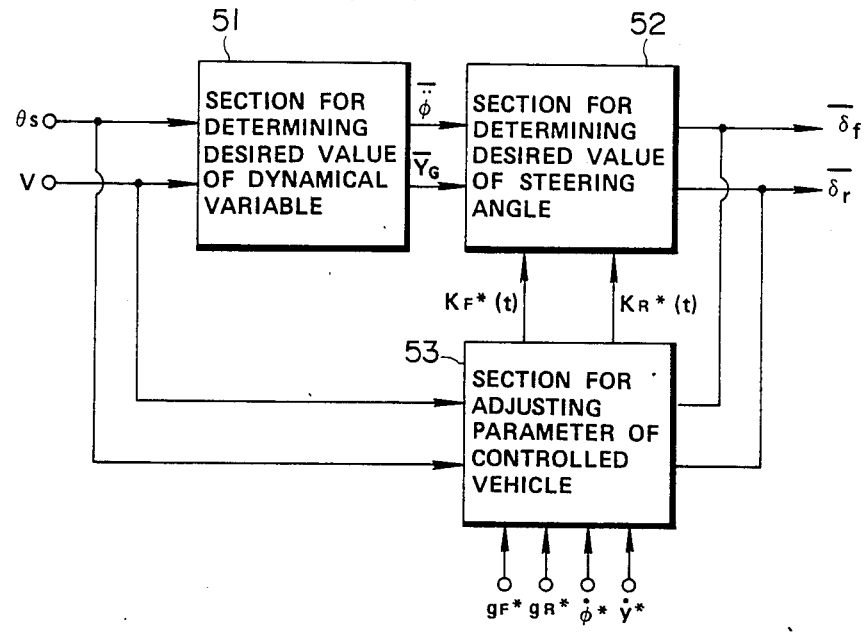
FIG. 4 is a block diagram functionally showing an inner structure of an processing unit shown in FIG. 2.

FIG. 4 shows a functional structure of the processing unit 1. As shown, the processing unit 1 has a section 51 for determining a desired value of at least one dynamical variable, a section 52 for determining desired values of the front wheel steering angle and rear wheel steering angle, and a section 53 for adjusting the vehicle parameters of the controlled vehicle.

The desired dynamical variable determining section 51 receives the steering input quantity $\theta_S$ and vehicle speed V from the sensors 2 and 3, respectively, and calculates a desired value $\ddot{\phi}$ of the yaw acceleration and a desired value $\overline{Y}_G$ of the centripetal acceleration by solving equations of vehicle motion.

Vehicle parameters appearing in the equations of vehicle motion used in the section 51 are set equal to desired values determined by a desired vehicle. The desired vehicle may be identical to the controlled vehicle. That is, the desired values of the vehicle parameters may be equal to actual values of the vehicle parameters of the controlled vehicle. Alternatively, the desired vehicle may be of different type from the controlled vehicle. For example, the desired vehicle may be of a sports car type whereas the controlled vehicle is a sedan.

In this embodiment, the vehicle parameters of the desired vehicle are as follows:

$I_{Z1}$ = a yawing moment of inertia of the desired vehicle,
$M_1$ = a vehicle mass of the desired vehicle,
$L_1$ = a wheel base of the desired vehicle,
$L_{F1}$ = a distance between a front axle and a center of gravity of the desired vehicle,
$L_{R1}$ = a distance between a rear axle and the center of gravity of the desired vehicle,
$I_{K1}$ = a moment of inertia about a kingpin of the desired vehicle,
$K_{S1}$ = a steering stiffness of the desired vehicle,
$D_{K1}$ = a viscosity coefficient of a steering system of the desired vehicle,
$\xi_1$ = a trail of the desired vehicle,
$N_1$ = an overall steering gear ratio of the desired vehicle,
$K_{F1}$ = a cornering power of each of front wheels of the desired vehicle,
$K_{R1}$ = a cornering power of each of rear wheels of the desired vehicle.

The section 51 performs operations to determine a desired value of at least one of the dynamic variables. In this embodiment, the section 51 determines desired values of the yaw acceleration and centripetal acceleration (lateral acceleration) by using the following equations.

$$I_{K1}\ddot{\delta}_{f1} = N_1 K_{S1}(\theta_S - N_1 \delta_{f1}) - D_{K1}\dot{\delta}_{f1} - 2\xi_1 C_{F1} \quad (1)$$

$$M_1(\ddot{y}_1 + \dot{\phi}_1 V) = 2C_{F1} + 2C_{R1} \quad (2)$$

$$I_{Z1}\ddot{\phi}_1 = 2L_{F1}C_{F1} - 2L_{R1}C_{R1} \quad (3)$$

$$\beta_{F1} = \delta_{f1} - (\dot{y}_1 + L_{F1}\dot{\phi}_1)/V \quad (4)$$

$$\beta_{R1} = -(\dot{y}_1 - L_{R1}\dot{\phi}_1)/V \quad (5)$$

$$C_{F1} = K_{F1}\beta_{F1} \quad (6)$$

$$C_{R1} = K_{R1}\beta_{R1} \quad (7)$$

$$\ddot{\overline{\phi}} = \ddot{\phi}_1 \quad (8)$$

$$\overline{Y}_G = \ddot{y}_1 + \dot{\phi}_1 V \quad (9)$$

where
$\delta_{f1}$ = a steering angle of the front wheels of the desired vehicle (In this embodiment, the desired vehicle is a two-wheel steering vehicle.), $\dot{\phi}_1$ = a yaw rate of the desired vehicle,
$\ddot{\phi}_1$ = a yaw acceleration of the desired vehicle,
$\dot{y}_1$ = a lateral speed of the desired vehicle along its lateral, or Y, axis,
$\ddot{y}_1$ = a side slipping acceleration of the desired vehicle,
$\beta_{F1}$ = a side slip angle of the front wheels of the desired vehicle,
$\beta_{R1}$ = a side slip angle of the rear wheels of the desired vehicle,
$C_{F1}$ = a cornering force of each of the front wheels of the desired vehicle,
$C_{R1}$ = a cornering force of each of the rear wheels of the desired vehicle,
$\overline{\ddot{\phi}}$ = a desired value of the yaw acceleration,
$\overline{Y}_G$ = a desired value of the centripetal (lateral) acceleration.

The equations (1)–(3) are equations of motion of the desired vehicle. In order to solve these equations, the section 51 must perform four integrations in each operating cycle of a period $\Delta t$. A method of integration is chosen according to the required accuracy of integration. For example, an integration method expressed as:

$$A(t+\Delta t) = A(t) + \Delta t \cdot \dot{A}(t)$$

or a Runge-Kutta method may be employed.

Thus, the section 51 determines the desired value $\overline{\ddot{\phi}}$ of the yaw acceleration and the desired value $\overline{Y}_G$ of the centripetal (lateral) acceleration which are magnitudes of the yaw acceleration and centripetal acceleration of the desired vehicle corresponding to the instantaneous values of the steering input quantity $\theta_S$ and vehicle speed V. The control system of this embodiment is arranged to achieve the thus-determined desire values $\overline{\ddot{\phi}}$ and $\overline{Y}_G$ in the controlled vehicle.

The desired steering angle determining section 52 performs operations to determine desired values $\overline{\delta}_f$ and $\overline{\delta}_r$ of the front and rear wheel angles by using the desired values $\overline{\ddot{\phi}}$, $\overline{Y}_G$ and the actual values of the vehicle parameters of the controlled vehicle.

In this embodiment, the vehicle parameters of the controlled vehicle are as follows:
$I_{Z2}$ = a yawing moment of inertia of the controlled vehicle,
$M_2$ = a vehicle mass of the controlled vehicle,
$L_2$ = a wheel base of the controlled vehicle,
$L_{F2}$ = a distance between a front axle and a center of gravity of the controlled vehicle,
$L_{R2}$ = a distance between a rear axle and the center of gravity of the controlled vehicle,
$K_{F2}$ = a cornering power of each of the front wheels of the controlled vehicle,
$K_{R2}$ = a cornering power of each of the rear wheels of the controlled vehicle.

The section 52 calculates the desired value $\overline{\delta}_f$ of the front wheel steering angle and the desired value $\overline{\delta}_r$ of the rear wheel steering angle of the controlled vehicle from the actual values of the vehicle parameters of the controlled vehicle and the desired value $\overline{\ddot{\phi}}$ of the yaw acceleration and the desired value $\overline{Y}_G$ of the centripetal (lateral) acceleration by using the following equations.

$$C_{F2} = \frac{1}{2L_2}(M_2 L_{R2} \overline{Y}_G + I_{Z2} \overline{\ddot{\phi}}) \tag{10}$$

$$C_{R2} = \frac{1}{2L_2}(M_2 L_{F2} \overline{Y}_G - I_{Z2} \overline{\ddot{\phi}}) \tag{11}$$

$$\beta_{F2} = C_{F2}/K_{F2} \tag{12}$$

$$\beta_{R2} = C_{R2}/K_{R2} \tag{13}$$

$$\overline{\delta}_f = \beta_{F2} + (\dot{y}_2 + L_{F2}\dot{\phi}_2)/V \tag{14}$$

$$\overline{\delta}_r = \beta_{R2} + (\dot{y}_2 - L_{R2}\dot{\phi}_2)/V \tag{15}$$

$$\dot{y}_2 = \dot{y}_1 \tag{16}$$

$$\dot{\phi}_2 = \dot{\phi}_1 \tag{17}$$

where
$C_{F2}$ = a cornering force of each of the front wheels of the controlled vehicle,
$C_{R2}$ = a cornering force of each of the rear wheels of the controlled vehicle,
$\beta_{F2}$ = a side slip angle of the front wheels of the controlled vehicle,
$\beta_{R2}$ = a side slip angle of the rear wheels of the controlled vehicle,
$\dot{\phi}_2$ = a yaw rate of the controlled vehicle,
$\dot{y}_2$ = a lateral speed of the controlled vehicle along its lateral, or Y, axis.

The section 52 sends a signal representing the desired value $\overline{\delta}_f$ of the front wheel steering angle to the front wheel steering regulator 4, and a signal representing the desired value $\overline{\delta}_r$ of the rear wheel steering angle to the rear wheel steering regulator 5.

In response to the signals from the section 52 of the processing unit 1, the front and rear wheel steering regulators 4 and 5 supply fluid pressure, respectively, to the front and rear wheel steering hydraulic actuators 6 and 7, so that the front wheels 9 and 10 and the rear wheels 11 and 12 are steered so as to achieve the desired values $\overline{\delta}_f$ and $\overline{\delta}_r$.

Therefore, the yaw acceleration and centripetal (lateral) acceleration of the controlled vehicle are maintained equal to those of the desired vehicle, respectively, so that the controlled vehicle has cornering characteristics identical to those of the desired vehicle. In the case that the controlled vehicle is of a sedan type and the desired vehicle is of a sports car type, the characteristics of the controlled vehicle can be changed to characteristics of a sports car without changing the construction of the body of the controlled vehicle.

Changes in tire characteristics or road surface condition vary some of the actual vehicle parameters of the controlled vehicle. If the desired angle determining section 52 uses the vehicle parameters of the controlled vehicle all of which are set at constant values, the cornering characteristics of the controlled vehicle would be changed. The parameter adjusting section 53 acts to modify some of the actual values of the vehicle parameters of the controlled vehicle used in the section 52 in accordance with the actual dynamical variable of the controlled vehicle.

In this embodiment, the parameter adjusting section 53 modifies the front wheel cornering power $K_{F2}$ and the rear wheel cornering power $K_{R2}$ which are susceptible to changes in tire characteristics and road surface condition.

Figure 5:
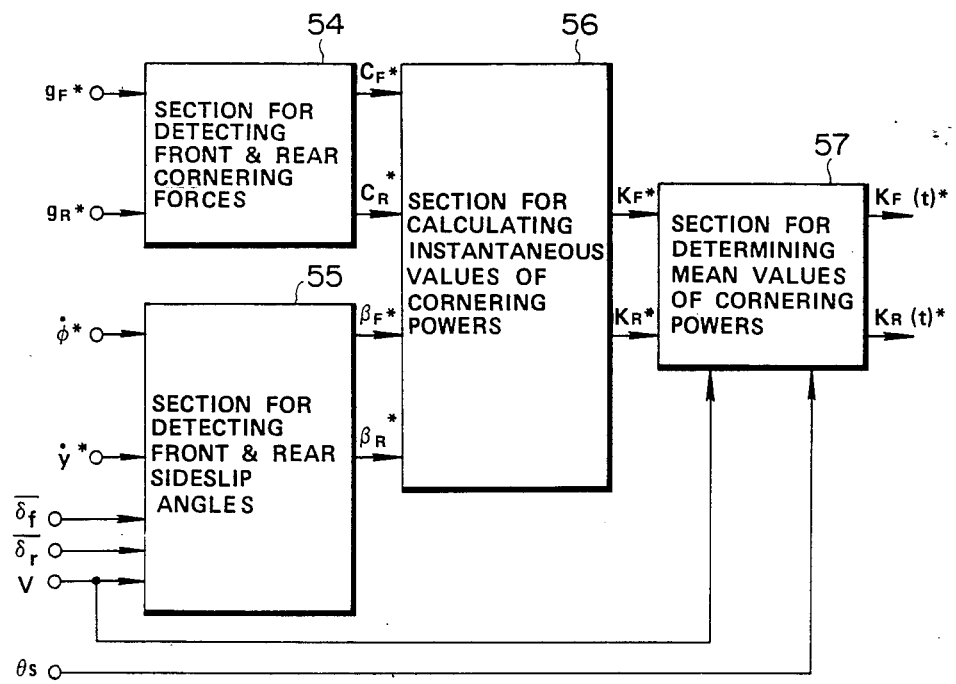
FIG. 5 is a block diagram functionally showing a parameter adjusting section shown in FIG. 4.

As shown functionally in FIG. 5, the parameter adjusting section 53 includes four subordinate sections 54-57. The subsection 54 detects front wheel and rear wheel cornering forces, and the subsection 55 detects front wheel and rear wheel side slip angles. The subsection 56 calculates instantaneous values of front wheel and rear wheel cornering powers, and the subsection 57 determines weighted averages of the instantaneous values of the front and rear wheel cornering powers.

The front and rear cornering force detecting subsection 54 receives the actual value $g_F^*$ of the lateral acceleration of the front wheels and the actual value $g_R^*$ of the lateral acceleration of the rear wheels from the front and rear acceleration sensors 13 and 14, and determines an actual value $C_F^*$ of the front wheel cornering force and an actual value $C_R^*$ of the rear wheel cornering force by the following equations.

$$C_F^* = \{(M_2 l_4^2 + I_{Z2}) g_F^* + (M_2 l_r l_f - I_{Z2}) g_R^*\}/2(l_f + l_r)^2 \quad (16)$$

$$C_R^* = \{(M_2 l_f l_r - I_{Z2}) g_F^* + (M_2 l_f^2 + I_{Z2}) g_R^*\}/2(l_f + l_r)^2 \quad (17)$$

Figure 7:
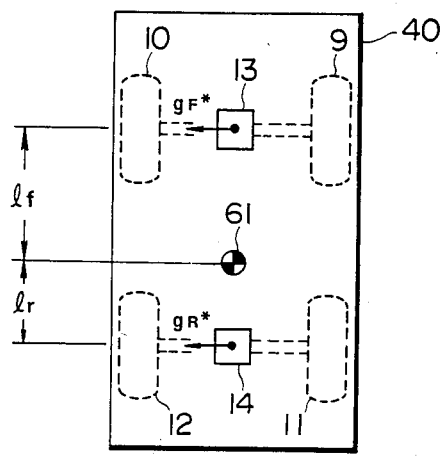
FIG. 7 is a view for showing locations of lateral acceleration sensors shown in FIG. 2.

In the equations (16) and (17), $l_f$ is a distance between the front acceleration sensor 13 and a center of gravity 61 of a vehicle body 40 of the controlled vehicle, and $l_r$ is a distance between the rear acceleration sensor 14 and the center of gravity 61. As shown in FIG. 7, the front and rear acceleration sensors 13 and 14 are disposed, respectively, at the middle point of an axial line of the front axle between the right and left front wheels 9 and 10, and at the middle point of an axial line of the rear axle between the right and left rear wheels. Therefore, $l_f = L_{F2}$ and $l_r = L_{R2}$.

The front and rear side slip angle detecting subsection 55 of the parameter adjusting section 53 receives the actual value $\dot{\phi}^*$ of the yaw rate of the controlled vehicle from the yaw rate sensor 15, the actual value $\dot{y}^*$ of the lateral speed of the controlled vehicle from the lateral speed sensor 16, the desired value $\overline{\delta_f}$ and $\overline{\delta_r}$ of the front and rear wheel steering angles from the desired steering angle determining section 52 and the vehicle speed V from the vehicle speed sensor 3. From these input data, the subsection 55 determines an actual value $\beta_F^*$ of the front wheel side slip angle and an actual value $\beta_R^*$ of the rear wheel side slip angle by the following equations.

$$\beta_F^* = \overline{\delta_f} - (\dot{y}^* + l_f \dot{\phi}^*)/V \quad (18)$$

$$\beta_R^* = \overline{\delta_r} - (\dot{y}^* + l_r \dot{\phi}^*)/V \quad (19)$$

The instantaneous cornering power calculating subsection 56 of the parameter adjusting section 53 receives the actual values $C_F^*$ and $C_R^*$ of the front and rear wheel cornering forces from the subsection 54, and the actual values $\beta_F^*$ and $\beta_R^*$ of the front and rear wheel side slip angles from the subsection 55. From these input data, the subsection 56 determines an instantaneous value $K_F^*$ of the front wheel cornering power and an instantaneous value $K_R^*$ of the rear wheel cornering power by the following equations.

$$K_F^* = C_F^*/\beta_F^* \quad (20)$$

$$K_R^* = C_R^*/\beta_R^* \quad (21)$$

It is possible to employ the instantaneous values $K_F^*$ and $K_R^*$ as adjusted values to be used in the desired steering angle determining section 52. However, the parameter adjusting section 53 of this embodiment has the mean cornering power determinining subsection 57 which is arranged to employ weighted averages $K_F^*(t)$ and $K_R^*(t)$ of the instantaneous values $K_F^*$ and $K_R^*$ as the adjusted values in order to lessen the influences of the scattering of sensed values of each sensor (For example, vibrations of a vehicle body tends to cause vibrations of sensor output signals.), and the influences of errors of the processing unit 1.

Figure 6:
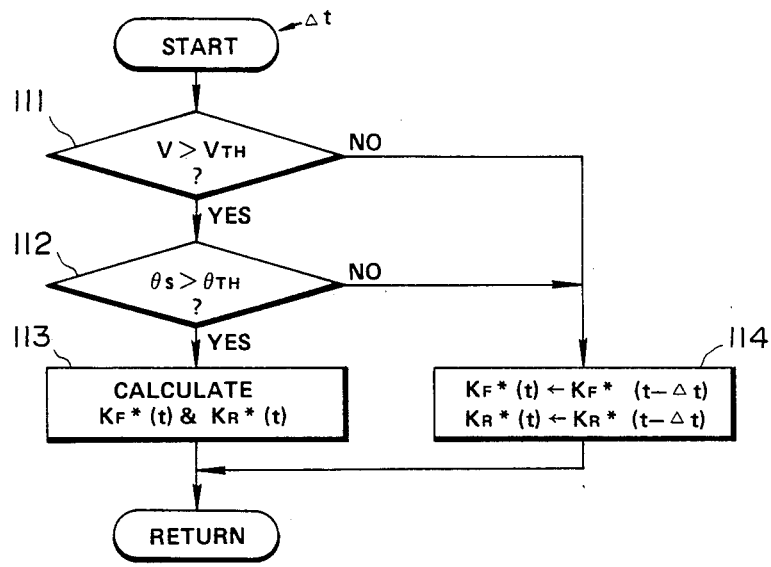
FIG. 6 is a flowchart showing a process used in a mean cornering power calculating section shown in FIG. 5.

In the subsection 57 of this emboidiment, a program shown in FIG. 6 is performed. At steps 111 and 112, the program determines whether the vehicle speed V is greater than a predetermined threshold speed $V_{TH}$, and whether the steering input angle $\theta_s$ is greater than a predetermined threshold angle $\theta_{TH}$. If either of the vehicle speed and steering input angle is equal to or smaller than the threshold, the program proceeds to a step 114, and keeps old weighted averages $K_F^*(t - \Delta t)$ and $K_R^*(t - \Delta t)$ of the front and rear wheel cornering powers which are determined in a previous operating cycle before an increment of time $\Delta t$ is added (The program of FIG. 6 is repeated at equal increments of time $\Delta t$.). When the steering input angle $\theta_s$ or the vehicle speed V is small, the actual values $C_F^*$ and $C_R^*$ of the cornering forces of the controlled vehicle and the actual values $\beta_F^*$ and $\beta_R^*$ of the side slip angles of the controlled vehicle are both so small that the errors in the processing unit 1 are increased too much. The step 114 eliminates such a possibility.

If both of the steering input angle $\theta_s$ and the vehicle speed V are greater than the respective thresholds, the program proceeds to a step 113, at which the program calculates new weighted averages $K_F^*(t)$ and $K_R^*(t)$ by the following equations.

$$K_F^*(t) = \alpha K_F^*(t - \Delta t) + (1 - \alpha) K_F^* \quad (22)$$

$$K_R^*(t) = \alpha K_R^*(t - \Delta t) + (1 - \alpha) K_R^* \quad (23)$$

where $0 < \alpha < 1$.

The weighted averages $K_F^*(t)$ and $K_R^*(t)$ of the front and rear wheel cornering powers determined in this way are inputted to the desired steering angle determining section 52 each time a time interval of $\Delta t$ elapses. By using these input data of $K_F^*(t)$ and $K_R^*(t)$, the section 52 calculates the desired steering angles $\overline{\delta_f}$ and $\overline{\delta_r}$. Therefore, the cornering characteristics of the controlled vehicle obtained by the system of this embodiment are always constant irrespectively of changes of tire or road conditions.

Figure 8:
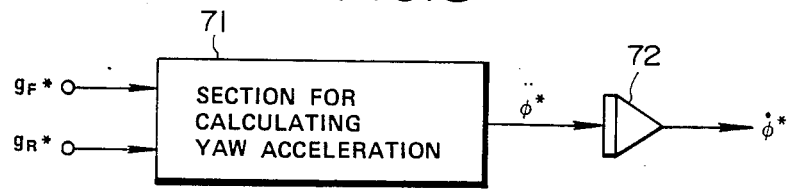
FIG. 8 is a block diagram showing one example of a yaw rate sensor shown in FIG. 2.

The yaw rate sensor 15 used in this embodiment may be a yaw rate gyro capable of sensing the yaw rate directly, or may be arranged as shown in FIG. 8. The sensor shown in FIG. 8 has a yaw acceleration calculating section 71 and integrating section, or integrator, 72. The yaw acceleration calculating section 71 receives the outputs $g_F^*$ and $g_R^*$ of the acceleration sensors 13 and 14, and determines the actual value $\ddot{\phi}^*$ of the yaw acceleration by the following equation.

$$\ddot{\phi}^* = (g_F^* - g_R^*)/(l_f + l_r) \quad (24)$$

The sections 71 and 72 may take the form of analog computing circuits or a microcomputer.

Figure 9:
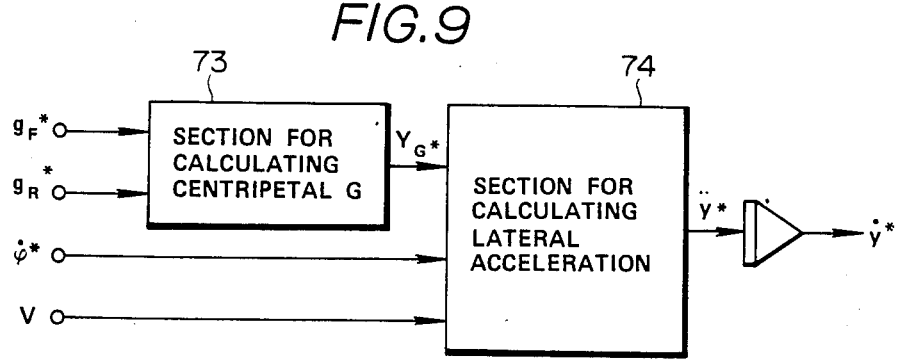
FIG. 9 is a block diagram for showing one example of a lateral speed sensor shown in FIG. 2.

The lateral speed sensor 16 may be an optical ground speed meter capable of sensing the lateral speed directly, or may be arranged as shown in FIG. 9. The sensor of FIG. 9 has a centripetal acceleration calculating section 73, a lateral acceleration calculating section 74 and an integrator. The section 73 receives the outputs $g_F^*$ and $g_R^*$ of the acceleration sensors 13 and 14, and determines an actual value $Y_G^*$ of the centipetal acceleration by the following equation.

$$Y_G^* = (l_f g_F^* + l_r g_R^*)/(l_f + l_r) \tag{25}$$

The section 74 receives the output $\dot{\phi}^*$ of the yaw rate sensor 15, the output V of the vehicle speed sensor 3, and the actual $Y_G^*$ determined by the section 73, and determines an actual value $\ddot{y}^*$ of the side slipping acceleration by the following equation.

$$\ddot{y}^* = Y_G^* - \dot{\phi}^* V \tag{26}$$

The sensor of FIG. 9 may take the form of analog computing circuits or a microcomputer.

The desired vehicle used in the present invention may be of any type. The desired vehicle may be identical to the controlled vehicle. For example, the desired vehicle may be assumed to be such a vehicle that its type is the same as the controlled vehicle but its steering system is of a conventional mechanical linkage type, in order to control the controlled vehicle equipped with the electronic control system of this invention to behave as if it were equipped with only a conventional mechanical steering system. The desired vehicle may be an imaginary vehicle having ideal cornering characteristics. Therefore, it is possible to mount a large-sized engine on a rally car and simultaneously to imrove the steering response characteristics.

The desired vehicle may be of a midship engine type. In this case, it is possible to let a front or rear engine vehicle have cornering characteristics identical to the characteristics of a midship engine vehicle.

The steering control system of the present invention may be arranged to store sets of data of two or more desired vehicles, and to select one of the desired vehicles according to driver's volition.

In the present invention, the rear wheel steering angle may be fixed. In this case, the processing unit 1 need not determine the desired value of the rear wheel steering angle, and the rear wheel steering regulator 5 and actuator 7 shown in FIG. 2 are not required.

The controlled vehicle of the present invention may have a conventional mechanical steering linkage for steering the front wheels. In this case, the front wheels are steered through the mechanical steering linkage, and the rear wheels are steered through the electronic control system of the present invention.

What is claimed is:

1. A steering control system for a controlled vehicle having a pair of first wheels and a pair of second wheels, comprising:

steering input sensing means for sensing a steering input quantity representing a driver's steering command of said controlled vehicle and determining a sensed value of said steering input quantity, vehicle speed sensing means for sensing a vehicle speed of said controlled vehicle and determining a sensed value of said vehicle speed, target behavior determining means connected with said steering input and vehicle speed sensing means for determining a desired value of at least one dynamic variable corresponding to said sensed values of said steering input quantity and said vehicle speed by solving for said dynamic variable a group of equations of vehicle motion characteristic of a desired vehicle by setting vehicle parameters appearing in said equations of vehicle motion equal to desired values representing said desired vehicle, steering angle determining means connected with said target determining means for determining a desired value of a first wheel steering angle of said first wheels required to achieve said desired value of said dynamic variable, by solving for said steering angle a group of equations of vehicle motion characteristic of said controlled vehicle using said desired value of said dynamic variable and actual values of vehicle parameters representative of said controlled vehicle, actuating means for steering said first wheels so that an actual first wheel steering angle is maintained equal to said desired value of said first wheel steering angle, actual vehicle behavior sensing means for sensing an actual value of said dynamic variable of said controlled vehicle, and parameter adjusting means connected with said steering angle determining means for adjusting said actual value of at least one of said vehicle parameters used by said steering angle determining means in accordance with said actual value of said dynamic variable sensed by said actual behavior sensing means.

2. A steering control system according to claim 1 wherein said vehicle parameters representing said target vehicle and representing said controlled vehicle comprise a yawing moment of inertia $I_Z$ of a vehicle, a vehicle mass M, a distance $L_F$ between a front axle and a center of gravity of the vehicle, a distance $L_R$ between a rear axle and the center of gravity of the vehicle, an overall steering gear ratio N, a cornering power $K_F$ of each of front wheels, and a cornering power $K_R$ of each of rear wheels.

3. A steering control system according to claim 2 wherein said group of equations of motion used by said target behavior determining means comprises an equation of lateral motion and an equation of yaw expressed, respectively, as;

$$M(\ddot{y} + \dot{\phi}V) = 2C_F + 2C_R$$

$$I_Z \ddot{\phi} = 2L_F C_F - 2L_R C_R$$

where V is the vehicle speed, $\dot{\phi}$ is a yaw rate, $\ddot{\phi}$ is a yaw acceleration, $\ddot{y}$ is a side slipping acceleration, $C_F$ is a cornering force of each of the front wheels, and $C_R$ is a cornering force of each of the rear wheels.

4. A steering control system according to claim 3 wherein said angle determining means uses said equation of lateral motion and said equation of yaw.

5. A steering control system according to claim 4 wherein said at least one dynamic variable includes yaw rate, yaw acceleration, lateral acceleration and centripetal acceleration.

6. A steering control system according to claim 5 wherein said vehicle parameters representing said desired vehicle further comprise a moment of inertia about a kingpin $I_K$, a steering stiffness $K_S$, a viscosity coefficient $D_K$ of a steering system, and a trail $\xi$, and wherein said group of equations characteristic of said desired vehicle further comprises an equation of steering system expressed as follows:

$$I_K \ddot{\delta}_f = N K_S(\theta_s - N\delta_f) - D_K \dot{\delta}_f - 2\xi C_F$$

where $\delta_f$ is a steering angle of front wheels, and $\theta_s$ is the steering input quantity.

7. A steering control system according to claim 6 wherein said target determining means determines desired values of the yaw acceleration and a centripetal acceleration.

8. A steering control system according to claim 7 wherein said steering angle determining means further determines a desired value of a second wheel steering angle of said second wheels.

9. A steering control system according to claim 1 wherein said parameter adjusting means modifies vehicle parameters representing a first wheel cornering power and a second wheel cornering power that are to be used by said steering angle determining means, from said actual values to adjusted values, respectively.

10. A steering control system according to claim 9 wherein said actual behavior sensing means senses actual values of a first wheel cornering force, a second wheel cornering force, a first wheel side slip slip angle and a second wheel side slip angle.

11. A steering control system according to claim 10 wherein said parameter adjusting means determines an instantaneous value of said first wheel cornering power by dividing said actual value of said first wheel cornering force by said actual value of said first wheel side slip angle, and an instantaneous value of said second wheel cornering force by dividing said actual value of said second wheel cornering force by said actual value of said second wheel side slip angle.

12. A steering control system according to claim 11 wherein said parameter adjusting means determines a weighted average of said first wheel cornering power and a weighted average of said second wheel cornering power.

13. A steering control system according to claim 12 wherein said parameter adjusting means determines said weighted averages of said first and second wheel cornering powers periodically so that said weighted average of each cornering power determined in a current cycle is equal to a sum of said weighted average determined in a previous cycle multiplied by a predetermined factor which is greater than zero and smaller than one, and said instantaneous value multiplied by a difference obtained by subtracting said predetermined factor from one.

14. A steering control system according to claim 13 wherein said parameter adjusting means sets said adjusted values of said first and second wheel cornering powers, respectively, equal to said weighted averages of said first and second wheel cornering powers determined in the current cycle if said sensed value of said vehicle speed is greater than a predetermined threshold speed and said sensed value of said steering input quantity is greater than a predetermined threshold quantity, and equal to said weighted averages determined in the previous cycle if said sensed value of said steering input quantity is smaller than said threshold quantity or if said sensed value of said vehicle speed is smaller than said threshold speed.

15. A steering control system according to claim 14 wherein said actual behavior sensing means comprises a first acceleration sensor for sensing a lateral acceleration of said first wheels, a second acceleration sensor for sensing a lateral acceleration of said second wheels, a yaw rate sensor for sensing the yaw rate of said controlled vehicle, and a lateral speed sensor for sensing a lateral speed of said controlled vehicle.

16. A steering control system according to claim 1 wherein said target determining means solves said group of equations of vehicle motion characteristic of the desired vehicle by performing a first process of integration for finding an output quantity substantially equal to a time integral of an input quantity during turning movement of said controlled vehicle, and wherein said steering angle determining means solves said group of equations of vehicle motion characteristic of the controlled vehicle by performing a second process of integration during turning movement of said controlled vehicle.

17. A steering control system according to claim 1 wherein said target determining means solves said group of equations of vehicle motion characteristic of the desired vehicle during steady state turning motion and during transient state turning motion, and wherein said steering angle determining means solves said group of equations of vehicle motion characteristic of the controlled vehicle during steady state turning motion and during transient state turning motion.

18. A steering control system according to claim 1 wherein said actual vehicle behavior sensing means senses a turning behavior of said controlled vehicle.

* * * * *